Figure 1:
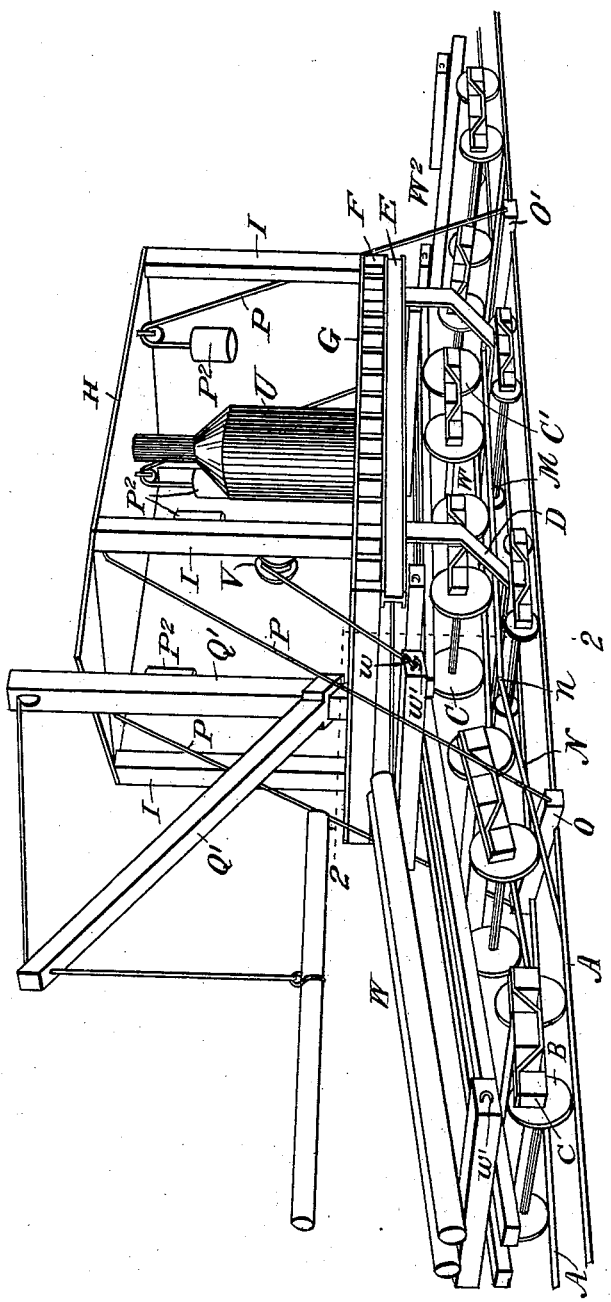

No. 621,043. Patented Mar. 14, 1899.
G. W. DECKER.
CAR LOADING APPARATUS.
(Application filed Dec. 2, 1896.)

(No Model.) 4 Sheets—Sheet 1.

Witnesses
William C. Roberts
W. A. Alexander.

Inventor
George W. Decker
By Attorney Benj. F. Ry

THE NORRIS PETERS CO., PHOTO-LITHO., WASHINGTON, D. C.

No. 621,043. Patented Mar. 14, 1899.
G. W. DECKER.
CAR LOADING APPARATUS.
(Application filed Dec. 2, 1896.)
(No Model.) 4 Sheets—Sheet 2.
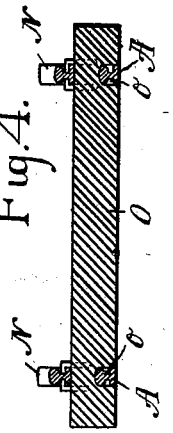
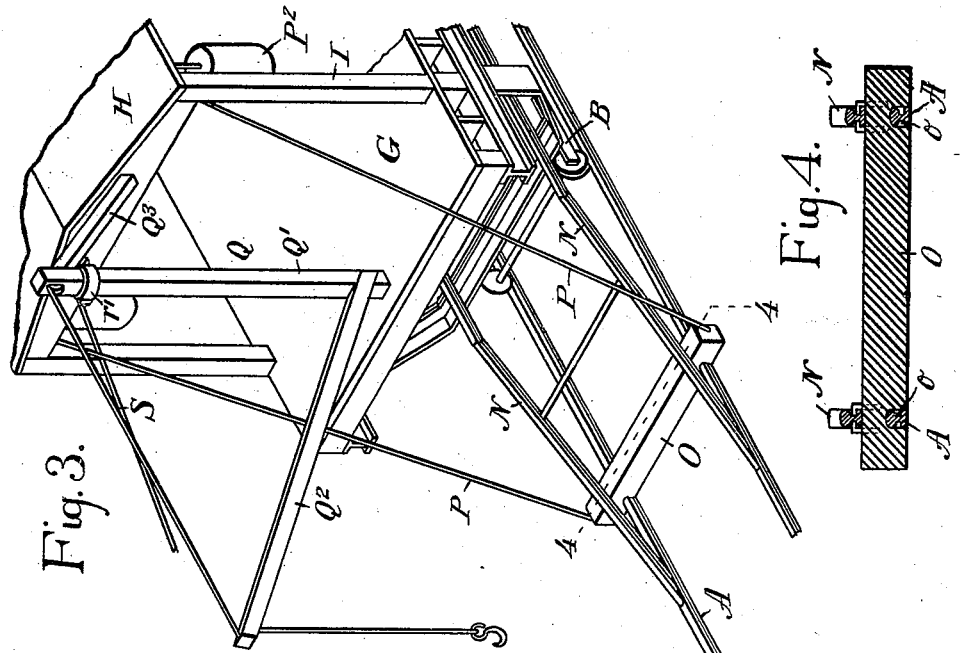
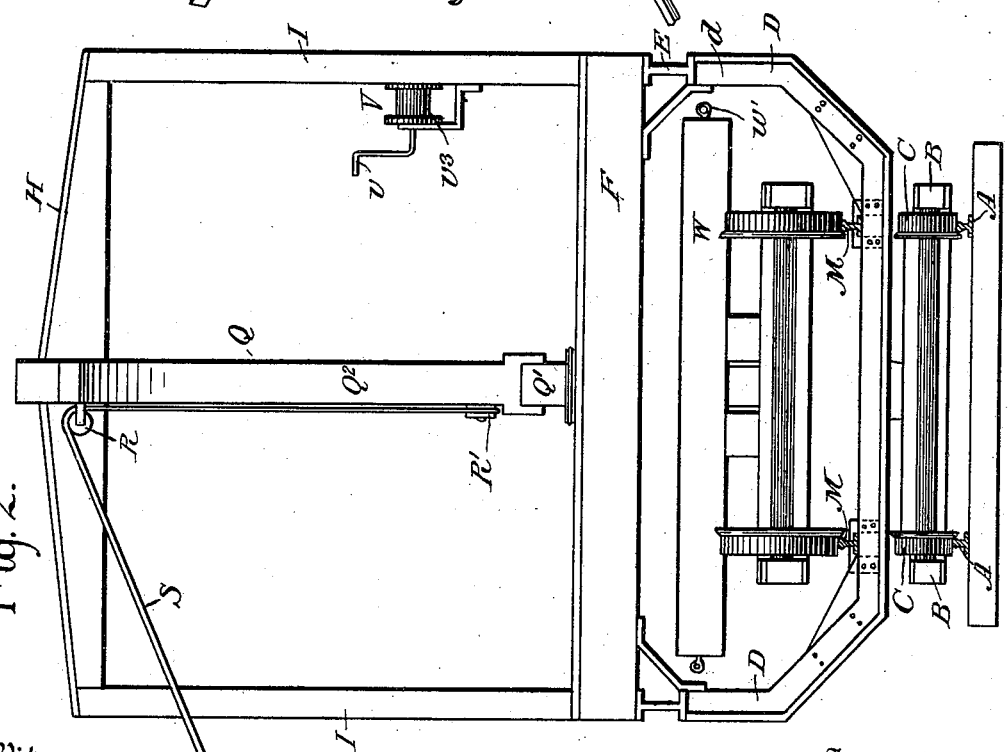
Witnesses
William C. Roberts
W. C. Alexander
Inventor
George W. Decker
By Attorney Benj. J. Ry No. 621,043. Patented Mar. 14, 1899.
G. W. DECKER.
CAR LOADING APPARATUS.
(Application filed Dec. 2, 1896.)
(No Model.) 4 Sheets—Sheet 3.
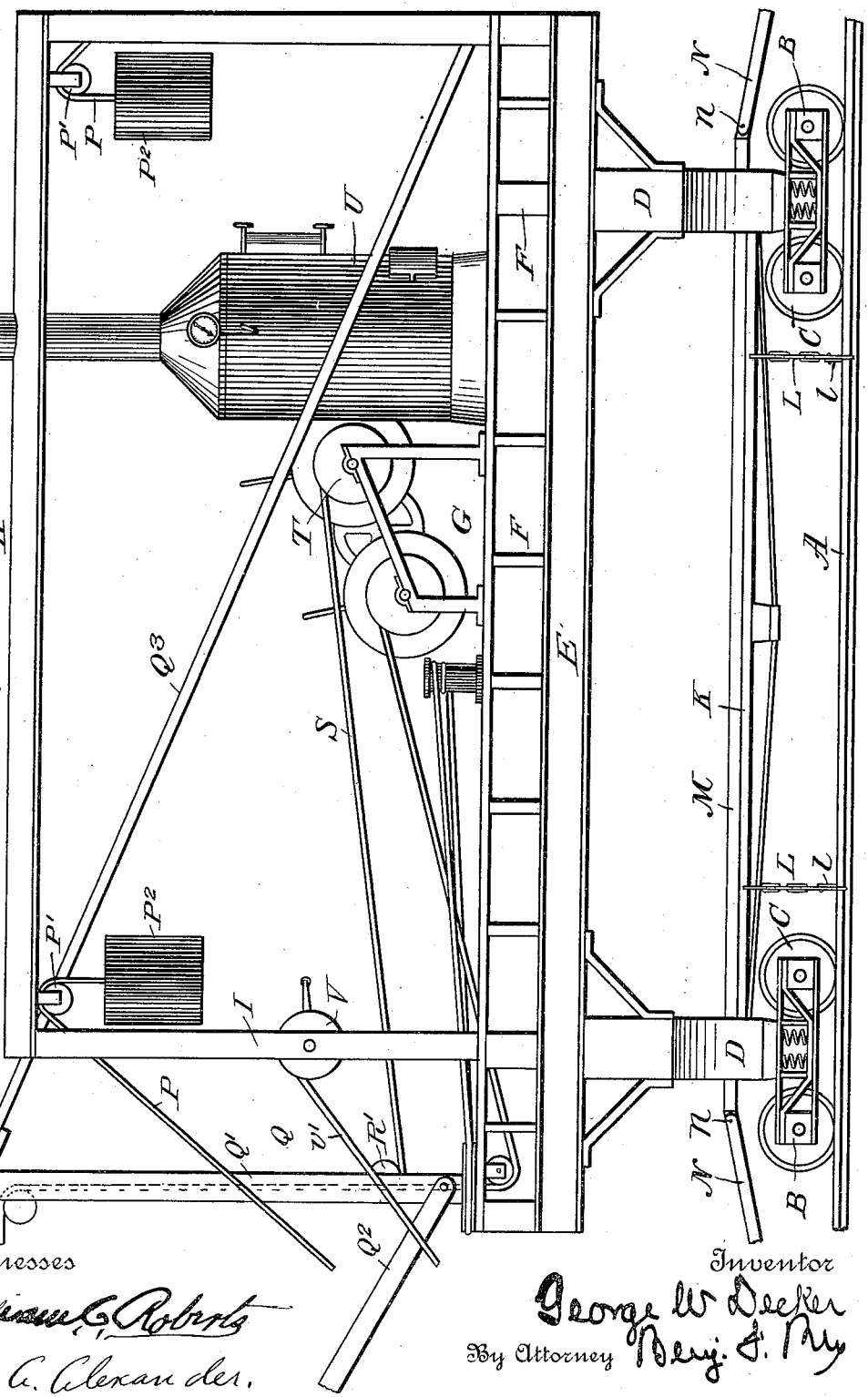

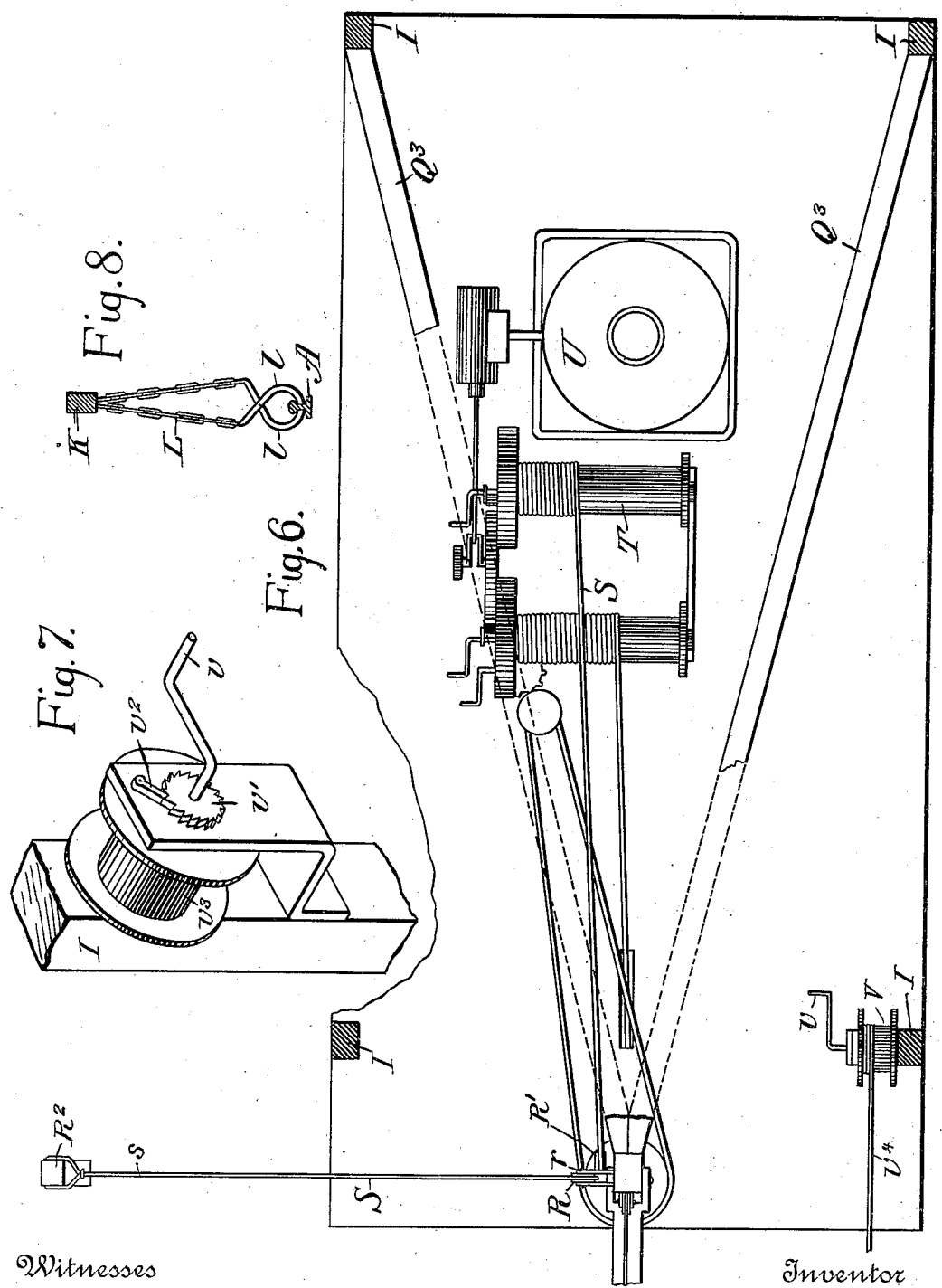

UNITED STATES PATENT OFFICE.

GEORGE W. DECKER, OF NEWPORT, ARKANSAS.

CAR-LOADING APPARATUS.

SPECIFICATION forming part of Letters Patent No. 621,043, dated March 14, 1899.

Application filed December 2, 1896. Serial No. 614,247. (No model.)

*To all whom it may concern:*

Be it known that I, GEORGE W. DECKER, a citizen of the United States, residing at Newport, in the county of Jackson and State of Arkansas, have invented a new and useful Car-Loading Apparatus, of which the following is a specification.

My invention relates to an apparatus for loading railway-cars; and the chief object of my improvement is to provide a portable loading apparatus which can be used for loading all the cars of a train, while itself remaining stationary on the main track. I attain that object and other secondary objects by mechanism of which the forms preferred where the apparatus is designed for loading logs are illustrated in the accompanying drawings, in which—

Figure 1 is a general view in perspective of my apparatus, with details omitted, and a train of logging-cars, one of which is in position for loading. Fig. 2 is in part a vertical cross-section, on an enlarged scale, on line 2 2, Fig. 1, and in part a front elevation of the apparatus. Fig. 3 is a front elevation of the apparatus with the winch and guy shown in Fig. 2 omitted. Fig. 4 is a detailed view of a vertical cross-section on line 4 4, Fig. 3. Fig. 5 is a detailed view, in side elevation, of the preferred form of my apparatus with parts projecting at the ends broken away. Fig. 6 is a detailed plan view of the apparatus with the roof removed. Fig. 7 is a detailed view in perspective of a winch. Fig. 8 is a detailed view of a form of clamping mechanism preferably used to secure the car-loading apparatus to the track upon which it rests.

Similar letters refer to similar parts throughout the several views.

A A, Figs. 1, 2, 3, 4, and 5, represent the rails of an ordinary stationary railway-track upon which my apparatus is designed to run and on which it stands when in use for loading cars.

B B, Figs. 1, 2, 3, and 5, are four-wheeled car-trucks of a common type upon which the body of my apparatus is shown supported. The wheels C of said trucks are designed to run upon the rails A of the stationary track.
They are of ordinary form, but are preferably of smaller diameter than ordinary freight-car wheels, so as to enable the horizontal portion of the portable track, hereinafter described, to be carried lower than would otherwise be practicable.

D D, Figs. 1, 2, 3, and 5, are body-bolsters which rest upon the trucks B and are shown U-shaped; but that form, though preferable, is not essential.

E E, Figs. 1, 2, 3, and 5, are sills shown resting upon the upturned ends $d$ of the body-bolsters D and connecting said bolsters together. Joists F, Figs. 1, 2, 3, and 5, rest upon the sills E, and a floor P rests upon the joists.

The roof H, Figs. 1, 2, 3, and 5, is shown supported upon four posts I, whose lower ends preferably rest upon the sills E.

K K, Figs. 2 and 5, are truss-beams which assist the sills E in holding the body-bolsters together. To said beams I preferably attach anchors L, Figs. 5 and 8, by means of which the apparatus is preferably secured to the rails A of the main track when it is in use by causing the clamping-jaws $l\,l$ to grip the rails, as shown most clearly in Fig. 8. The anchor L is an old and well-known device and will not be more particularly described for that reason.

M M are a pair of rails of ordinary form laid upon and secured to the bolsters D. They are spaced apart, so as to form a section of track of the same gage as the main track upon which the apparatus is intended to run. Between them and the joists F there is a space high enough to permit of the passage of a logging-car. To each end of each rail M the inner end of a rail N is shown connected by a pivot $n$, permitting the outer ends of the rail N to be raised and lowered, and when the outer ends of said rails N are permitted to drop they form two inclined sections of track, one leading up from the main track at each end of the car to the central section of track formed of the rails M and connecting the latter section with the main track at both ends, as shown most clearly in Figs. 1 and 3. The outer ends of said rails N preferably rest directly upon the rails of the main track when in their lowest positions and are preferably beveled on the under side at their lower ends, so as to enable them to rest firmly upon the rails A and make a close connection therewith; but, as will be obvious, direct contact is not essential and I do not wish any of my claims to be understood as limiting me to a combination in which the ends of said rails rest directly upon those of the main track when lowered.

The rails N of each end section are shown connected by means of two ties O and O'. The ties O are each preferably provided with two transverse grooves $o$ on their respective under sides, one near each end and each adapted to receive the top of a rail A when the outer ends of the rails thereby connected are lowered, as shown most clearly in Figs. 3 and 4, and the bottoms of said grooves preferably rest upon the tops of the rails which enter them, so that in their preferred form the ties O not only serve to hold the rails N in the proper positions with reference to each other, but also when the outer ends of said end sections of track are lowered form a support for the rails N and assist in holding the lower ends of said rails in position with reference to the rails A.

To the ends of each of the ties O the ends of ropes P are preferably attached, and said ropes preferably pass to and through pulleys P', carried by the car, and have attached to their respective ends counterbalances $P^2$ to facilitate the elevation of the outer ends of the rails N when the apparatus is to be moved from one place to another.

Q, Figs. 1, 2, 3, and 5, is a derrick of ordinary construction having a mast Q', a boom $Q^2$, and stiff legs $Q^3$. It is shown supported above the track passing through the apparatus by the floor G and may be operated in the usual manner by means of the hoisting-engine shown connected therewith. To the upper end of the mast Q' a sheave R is shown attached by a bracket $r$, secured to a band $r'$, which preferably encircles the mast and turns thereon. A similar sheave R' is attached to the mast near its lower end.

S is a guy-rope whose inner end is secured to a winding-drum T of common form. Said rope passes from said drum first through the sheave R', then up and out through the sheave R, and its outer end $s$ is shown in Fig. 6 secured to a post $R^2$ at one side of the track.

U is a hoisting-engine of ordinary construction connecting with the winding-drums T in an old and well-known manner, which, as it forms no part of my improvement, need not be described. Said engine and drum are, like the derrick, preferably supported by the floor G, as shown.

V, Figs. 2, 3, 5, 6, and 7, is a winch of ordinary form, having a crank $v$, ratchet-wheel $v'$ and pawl $v^2$, and drum $v^3$, and $v^4$ is the rope wound upon said winch and provided at its outer end with a hook $v^5$.

W, W', and $W^2$ represent a train of logging-cars, each car preferably having attached to each end of each of its bunks $w$ an eye $w'$.

The mode of operation of the preferred form of my apparatus when used for loading logging-cars is as follows: The car being placed in position with the logs to be handled within reach of its derrick is secured to the main track by means of the anchors L. The end sections of the portable track carried thereby are then lowered until the outer ends of the rails N and the bottoms of the grooves $o$ in the ties O rest upon the tops of the rails A of the main track. The outer end $s$ of the guy-rope S is then fastened to a stationary support at the side of the apparatus opposite the one on which the logs are located and drawn taut by causing the winding-drum T to revolve. The train of cars to be loaded should in the beginning stand in front of the apparatus, and when work is to be begun it should be backed through the apparatus over the portable track above described until the front car is in the position in which the car W is represented in Fig. 1. The front car is then secured to the apparatus by passing the hook $v^5$ through an eye $w'$ of the nearest bunk and winding up the rope $v^4$, to which the hook is attached, by means of the winch V until it is taut. Everything being in readiness, the front car is loaded with logs by means of the derrick Q. When the front car is loaded, the pawl $v^2$ is thrown out of engagement and the hook $v^5$ removed from the eye $w'$, so as to free the car, which, together with the other cars, is then drawn forward until the second car of the train is in the position previously occupied by the front car. The second car is then attached to the loading apparatus and loaded, and so on until all the cars of the train have been loaded. If while loading a car the engineer observes that the weight of a log being lifted is tilting the car to one side, he can draw it back into a perpendicular position by causing the winding-drum T to revolve.

I prefer to use the form of apparatus above described; but I believe my improvement to be a generic one and do not wish to be confined to the special forms of mechanism described nor to an apparatus provided with all of the attachments above mentioned.

Where I mention a "hoisting apparatus" in my claims, I do not wish to be understood as including a hoisting-engine or means for operating the derrick or other hoisting apparatus, neither do I wish to be understood as confining myself to a derrick where I use said phrase, for there are a number of other well-known forms of hoisting apparatus which will at once suggest themselves to the reader as suitable for lifting logs, &c., onto cars and which are well-known equivalents or substitutes for a derrick, and all come within the meaning of the phrase "hoisting apparatus" as I use it.

Where I say in substance in a claim that the portable track after passing over the car mentioned extends down at an incline, I do not wish to be understood as limiting myself to a combination in which the portable track extends directly down from the rear end of the car mentioned, nor do I wish to be understood as limiting myself to a car of any particular length or form, except where I expressly limit myself in my claims.

I desire my claims to be construed broadly.

I claim—

1. The combination of a stationary railway-track; a car movable upon said track; and a portable section of track secured to the car and movable therewith along said main track, and extending up from said main track at an incline at one end of the car and passing thence over or through the car toward its other end, substantially as described.

2. In a car-loading apparatus, a car; and a portable railway-track extending up at an incline at one end of the car, passing thence over or through the car to the opposite end, and then down at an incline.

3. In a car-loading apparatus, a car; a portable railway-track extending up at an incline, at one end of the car, then passing over or through the car toward its opposite end; and a hoisting apparatus carried by the car.

4. In a car-loading apparatus, a car; a portable railway-track extending up at an incline at one end of the car, passing over or through the car to its opposite end, and then down at an incline; and a hoisting apparatus supported by the car above the level of the track.

5. The combination of a stationary railway-track, a car upon the track; a portable track leading from the main track up, at an incline, at one end of the car, and extending through the car toward the opposite end; and a hoisting apparatus carried by the car.

6. The combination of a stationary railway-track; a car upon the track; a portable track leading from the main track up at an incline at one end of the car, then passing over or through the car to the opposite end and down again to the main track; and a hoisting apparatus carried by the car.

7. The combination of a stationary railway-track; a car upon the track; a portable track leading from main track up at an incline, at one end of the car, then passing through the car to the opposite end, and down again to the main track; a support for a hoisting apparatus above the portable track with space enough between it and the portable track for the passage of a car, and a hoisting apparatus upon said support.

8. The combination in a loading apparatus, of a car, and a portable track, having a central section extending through or over the car, and two end sections, one extending up at an incline at each end of the car; and means pivotally connecting the inner ends of the end sections of track to the central section.

9. The combination in a loading apparatus of a car; a portable track having a central section extending through or over the car, and two end sections, one extending up at an incline at each end of the car; means connecting the inner ends of the end sections of track, to the central section; and two ties, one for each of said end sections, and each having two transverse grooves across its under side, each for the reception of the top of a rail of the main track, and the rails of each of said end sections of portable track being secured to one of said ties substantially as described.

10. The combination in a loading apparatus of a car and a portable track having a central section extending through or over the car and two end sections one extending up at an incline at each end of the car; means pivotally connecting the inner ends of the end sections to the central section of portable track and means for elevating the outer ends of said end sections.

11. The combination of the stationary track; a car resting upon the main track; a portable track leading up from the main track at an incline at one end of the car and extending through or over the car toward its opposite end; a hoisting apparatus carried by the car; and mechanism detachably securing the car to the rails of the main track.

12. The combination in a car-loading apparatus, of a car; a portable track leading up at one end of the car at an incline and extending over or through the car toward its opposite end; a hoisting apparatus carried by the car, having a substantially upright member; a sheave; means securing the sheave to the upper portion of said upright member of a hoisting apparatus; a winding-drum carried by the car; and a guy-rope secured to said drum, and passing through said sheave and having its outer end free from attachment to a stationary object at one side of the car substantially as described.

13. The combination of a stationary railway-track, a car upon the track; a portable track extending from the main track upward at an incline at one end of the car, and then through or over the car toward its opposite end; a hoisting apparatus upon the car; a freight-car resting in part upon said portable track; and mechanism for detachably securing said cars together substantially as described.

GEORGE W. DECKER.

Witnesses:
JAMES L. ABBOT, Jr.,
THADDEUS D. KINNARD.